US010127004B2

United States Patent
Nakai

(10) Patent No.: US 10,127,004 B2
(45) Date of Patent: Nov. 13, 2018

(54) DISPLAY DEVICE AND DISPLAY SIGNAL INPUT SYSTEM AND DISPLAY SIGNAL INPUT METHOD THEREOF

(71) Applicant: BOE Technology Group Co., Ltd., Beijing (CN)

(72) Inventor: Tadashi Nakai, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 156 days.

(21) Appl. No.: 15/126,033

(22) PCT Filed: Nov. 3, 2015

(86) PCT No.: PCT/CN2015/093702
§ 371 (c)(1),
(2) Date: Sep. 14, 2016

(87) PCT Pub. No.: WO2016/192300
PCT Pub. Date: Dec. 8, 2016

(65) Prior Publication Data
US 2018/0173482 A1    Jun. 21, 2018

(30) Foreign Application Priority Data

May 29, 2015   (CN) .......................... 2015 1 0290761

(51) Int. Cl.
*G06K 9/36*   (2006.01)
*G06F 3/147*   (2006.01)
(Continued)

(52) U.S. Cl.
CPC .............. *G06F 3/147* (2013.01); *G06F 3/048* (2013.01); *G06F 3/14* (2013.01); *G06T 3/4038* (2013.01)

(58) Field of Classification Search
CPC .... G06T 3/4038; H04N 7/015; H04N 9/3102; G06F 2209/5017; G06F 9/5027; G06F 9/5066
See application file for complete search history.

(56) References Cited

U.S. PATENT DOCUMENTS

2011/0211120 A1* 9/2011 Taniguchi ............ H04N 9/3102
                                                        348/576
2015/0348250 A1* 12/2015 Nakai ...................... G09G 3/20
                                                        345/635

FOREIGN PATENT DOCUMENTS

CN         101952854 A      1/2011
CN         103259963 A      8/2013
(Continued)

OTHER PUBLICATIONS

Mar. 4, 2016—International Search Report for PCT/CN2015/093702 (with English Translation).
(Continued)

*Primary Examiner* — Tom Y Lu
(74) *Attorney, Agent, or Firm* — Banner & Witcoff, Ltd.

(57) ABSTRACT

A display device and a display signal input system and a display signal input method thereof are provided. The display signal input method includes: receiving sub-images; grouping the sub-images into a plurality of sub-image groups of a base level; judging information of edge matching between sub-image units in each sub-image group of a current level; if edge matching between the sub-image units in each sub-image group of the current level is correct, grouping respective sub-image groups of the current level as sub-image units to form sub-image groups of a new level, and performing judgment again till edge matching between any two adjacent sub-images in an image formed by splicing the sub-images is correct; and outputting information of the
(Continued)

respective sub-images arranged in sequence to the display device.

18 Claims, 3 Drawing Sheets

(51) Int. Cl.
  *G06F 3/14* (2006.01)
  *G06F 3/048* (2013.01)
  *G06T 3/40* (2006.01)

(56) References Cited

FOREIGN PATENT DOCUMENTS

| | | |
|---|---|---|
| CN | 104820577 A | 8/2015 |
| WO | 2007135807 A1 | 11/2007 |

OTHER PUBLICATIONS

Mar. 4, 2016—(WO) Written Opinion of ISA—Intl App PCT/CN2015/093702 (with English Translation).

* cited by examiner

DISPLAY DEVICE AND DISPLAY SIGNAL INPUT SYSTEM AND DISPLAY SIGNAL INPUT METHOD THEREOF

The application is a U.S. National Phase Entry of International Application No. PCT/CN2015/093702 filed on Nov. 3, 2015, designating the United States of America and claiming priority to Chinese Patent Application No. 201510290761.X, filed on May 29, 2015. The present application claims priority to and the benefit of the above-identified applications and the above-identified applications are incorporated by reference herein in their entirety.

TECHNICAL FIELD

Embodiments of the present disclosure relate to a display device and a display signal input system and a display signal input method thereof.

BACKGROUND

Currently, pixel resolution values of some high-definition display devices have reached 8K4K level (namely, 8000× 4000 level, for example, 76800×4320); correspondingly, the resolution of each frame of the video image input in a display device needs to be improved, and thus, video information amount contained in each frame of image is also greatly increased.

For example, a high-definition TV with pixel resolution of 8K4K level needs video information amount 16 times more than that of a full high-definition TV at the time of signal input, and therefore each frame of image that is input needs to be divided into 16 sub-images to be respectively input, and then the respective sub-images after being input are combined/spliced for displaying.

Currently, a display signal input device of the display device adopts a random ranking and judging scheme in ranking sub-images formed by dividing an original image, and the scheme is great in computation amount and consumes a long time period.

SUMMARY

An embodiment of the present disclosure provides a display signal input method, comprising: a first step: receiving at least four sub-images formed by dividing an original image; a second step: grouping the received sub-images into a plurality of sub-image groups of a base level, the sub-image group of the base level including at least two sub-image units, and each sub-image unit including at least one sub-image; a third step: judging information of edge matching between every two adjacent sub-image units in each sub-image group of a current level, wherein: if edge matching between the sub-image units in at least one sub-image group of the current level is not correct, respective sub-pixel units are grouped again in a grouping manner different from a grouping manner of the sub-image groups of the current level, and then the third step is repeated; or if edge matching between the respective sub-image units in each sub-image group of the current level is correct, a fourth step is performed; the fourth step: grouping respective sub-image groups of the current level judged in the third step as sub-image units so as to form sub-image groups of a new level, performing the third step with the formed sub-image groups of the new level as the sub-image groups of the current level till edge matching between any two adjacent sub-images in an image formed by splicing the respective sub-images is correct, and performing a fifth step; and the fifth step: outputting information of the respective sub-images arranged in sequence to a display device, so that the display device can display an image same as the original image.

In the above display signal input method, after respective sub-images formed by dividing an original image are received, the plurality of received sub-images are grouped into a plurality of sub-image groups of a base level, in a case edge matching between every two adjacent sub-image units in all the sub-image groups of the base level is correct, the sub-image groups of the base level are grouped again as sub-image units to form sub-image groups of a next level, and information of edge matching of respective sub-image units in the above sub-image groups of the next level is judged; the above process is repeated till a finally formed sub-image group contains all the sub-images formed by dividing the original image. In the above display signal input method, the sub-image unit of each sub-image group of the next level includes at least two sub-image units, and thus, when each sub-image group of the next level is formed, the sequence of the sub-image units regarded as the sub-image units in the sub-image groups of the next level needs not to be rearranged, which thus can reduce computation amount, shorten time for a signal input system to arrange the plurality of sub-images formed by dividing the original image and improve product quality.

For example, before the second step, the method further comprises: determining a dividing manner of the original image according to pixel resolution of the received sub-images so as to determine information of an arrangement manner of the respective sub-images.

For example, the third step further comprises: storing a judgment result of each circle and information of an arrangement manner of the sub-image units in the sub-image group of the current level till the fourth step is performed.

For example, after the fourth step, the method further comprises: in a case edge matching between any two adjacent sub-images in the image formed by splicing the sub-images is correct, storing corresponding information between an arrangement sequence of the respective sub-images in arranged image information and signal receiving units in the display device, which operation continues till a next operation.

For example, a number of the sub-images received in the first step is 16.

For example, in the second step, each sub-image group includes two sub-image units, each sub-image group of the base level includes two sub-image units, and one sub-image unit in each sub-image group of the base level includes one sub-image.

An embodiment of the present disclosure further provides a display signal input system, comprising: sub-image receiving units, configured for receiving at least four sub-images formed by dividing an original image; an image processing unit in signal connection with the sub-image receiving units, configured for grouping the received sub-images into a plurality of sub-image groups of a base level, the sub-image group of the base level including at least two sub-image units, and each sub-image unit including at least one sub-image, and meanwhile, configured for judging information of edge matching between every two adjacent sub-image units in each sub-image group of a current level, wherein the information of edge matching between two sub-image units in each sub-image group of the current level is judged, wherein: if edge matching between the sub-image units in at least one sub-image group of the current level is not correct, respective sub-image units are grouped again in a grouping manner different from a grouping manner of the sub-image group of the current level, and the information of edge matching between the sub-image units in each sub-image group of the current level is judged again; or if edge matching between the sub-image units in each sub-image group of the current level is correct, respective sub-image groups of the current level in the above judgment process are grouped as sub-image units so as to form sub-image groups of a new level, and then the sub-image groups of the new level are subjected to edge information judgment as the sub-image groups of the current level till edge matching between any two adjacent sub-images in an image formed by splicing the respective sub-images is correct; and a control unit in signal connection with the image processing unit, configured for outputting information of the respective sub-images arranged in sequence to a display device in a case edge matching between any two adjacent sub-images in the image formed by splicing the respective sub-images is correct, so that the display device can display an image same as the original image.

For example, the display signal input system further comprises: a flash memory module in signal connection with the control unit, the flash memory module being configured for storing corresponding information between an arrangement sequence of the respective sub-images in arranged image information and signal receiving units in the display device in the case edge matching between any two adjacent sub-images in the image formed by splicing the respective sub-images is correct, which operation continues till a next operation.

For example, the display signal input system further comprises: a frame storage module, configured for caching the sub-images, which are output from the respective sub-image receiving units, into a frame and outputting the sub-images to the display device together.

An embodiment of the present disclosure further provides a display device, and the display device comprises any one of the above display signal input systems.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Embodiments of the present disclosure provide a display device and a display signal input system and a display signal input method thereof. The display signal input method can also shorten time that is used when a plurality of sub-images formed by dividing an original image are arranged by the signal input system, and the convenience for external input connection is greatly improved, and therefore timeliness of transmission of display signals is guaranteed.

Figure 1:
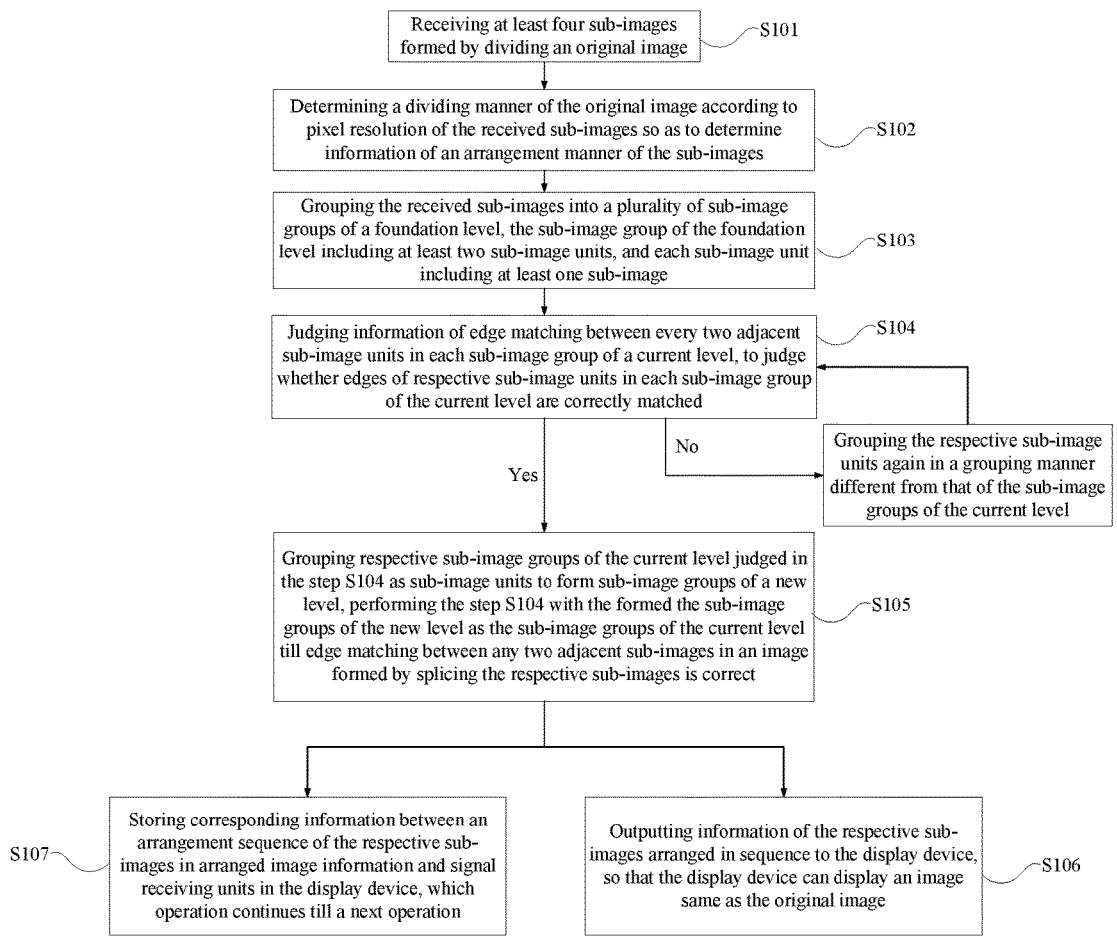
FIG. 1 is a flow diagram of a signal input method provided by an embodiment of the present disclosure.

Please refer to FIG. 1, the display signal input method provided by an embodiment of the present disclosure comprises:

Step S101: receiving at least four sub-images formed by dividing an original image;

Step S103: grouping the received sub-images into a plurality of sub-image groups of a base level, the sub-image group of the base level including at least two sub-image units, and each sub-image unit including at least one sub-image;

Step S104: judging information of edge matching between every two adjacent sub-image units in each sub-image group of the current level, wherein: if edge matching between the sub-image units in at least one sub-image group of the current level is not correct, respective sub-pixel units are grouped again in a grouping manner different from a grouping manner of the sub-image groups of the current level, and then the step S104 is repeated; if edge matching between the respective sub-image units in each sub-image group of the current level is correct, step S015 is performed;

Step S105: grouping respective sub-image groups of the current level judged in the step S104 as sub-image units to form sub-image groups of a new level, performing the step S104 with the formed the sub-image groups of the new level as the sub-image groups of the current level till edge matching between any two adjacent sub-images in an image formed by splicing the respective sub-images is correct, and performing a step S106;

Step S106: outputting information of the respective sub-images arranged in sequence to the display device, so that the display device can display an image same as the original image.

In the above display signal input method, after the sub-images formed by dividing the original image are received in the step S101, the plurality of received sub-images are grouped into a plurality of sub-image unit groups of a base level in the step S103, information of edge matching between every two adjacent sub-image units in each sub-image group of the current level is judged in the step S104, in the step S104, in the case where it is judged that edge matching between every two adjacent sub-image units in all the sub-image groups of the base level is correct, the sub-image groups of the base level are grouped again as the sub-image units to form sub-image groups of a next level, and edge matching information of sub-image units in the above sub-image groups of the next level is judged; the above process is repeated till a finally formed sub-image group contains all the sub-images formed by dividing the original image.

In order to facilitate understanding, in one exemplary implementation mode, it is provided that the original image is divided into sixteen (16) sub-images, in the step S103, the sixteen sub-images are grouped into eight sub-image groups of the base level, each sub-image group of the base level includes two sub-image units, and each sub-image unit includes a sub-image, then:

In the step S104, firstly, the eight sub-image groups of the base level serve as sub-image groups of the current level, and information of edge matching of two sub-images among the eight sub-image groups of the base level is judged; if information of edge matching between two sub-images in at least one sub-image group of the base level in the eight sub-image groups of the base level is not correct, the sub-images are grouped again in a grouping manner different from a grouping manner of the sub-image groups of the current level, and then the step S104 is performed again; if edge matching between two sub-images in each sub-image group of the base level is correct, each sub-image group of the base level is regarded as a sub-image unit in the step S105, the sub-image units are grouped to form four sub-image groups of a second level, and each sub-image group of the second level contains two sub-image groups of the base level that is regarded as the sub-image units.

With each sub-image group of the second level as the sub-image group of the current level, information of edge matching between two sub-image groups of the base level in each sub-image group of the second level formed in the step S105 is judged again in the step S104; if information of edge matching between two sub-image groups of the base level in at least one sub-image group of the second level among the four sub-image groups of the second level is not correct, the sub-image groups of the base level are grouped again in a diving manner different from the grouping manner of the sub-image group of the current level, and then the step S104 is performed again; if it is judged that edge information matching between two sub-image groups of the base level in each sub-image group of the second level is correct, the four sub-image groups of the second level are regarded as four sub-image units in the step S105, the four sub-image groups of the second level are grouped to form two sub-image groups of a third level, and each sub-image group of the third level includes two sub-image groups of the second level.

With each sub-image group of the third level as the sub-image group of the current level, information of edge matching between two sub-image groups of the second level in each sub-image group of the third level formed in the step S105 is judged in the step S104; if edge matching information between two sub-image groups of the second level in at least one sub-image group of the third level in two sub-image groups of the third level is not correct, the sub-image groups of the second level are grouped again in a grouping manner different from the grouping manner of the sub-image group of the current level, and then the step S104 is performed again; if edge matching between two sub-image groups of the second level in each sub-image group of the third level is correct, two sub-image groups of the third level are combined into a sub-image group of a fourth level in the step S105.

With the sub-image group of the fourth level as the sub-image group of the current level, information of edge matching between two sub-image groups of the third level in the sub-image group of the fourth level formed in the step S105 is judged in the step S104; if edge matching between the sub-image groups of the fourth level is not correct, the sub-image groups of the third level are grouped again in a grouping manner different from the grouping manner of the sub-image group of the current level, and then the step S104 is performed again; if edge matching between the sub-image groups of the fourth level is correct, an arrangement sequence between the sub-images in the sub-image group of the fourth level is a correct arrangement sequence at the moment, and then the above step S106 is performed.

In the above display signal input method, the sub-pixel units in each sub-image group of a next level at least include two sub-image units, and thus, after one sub-image group of the next level is formed, sub-image units regarded as the sub-image units in the sub-image group of the next level do not need to be rearranged, compared with a random matching manner, for example, sixteen sub-images are randomly ranked, the embodiment can reduce computation amount, which thus can shorten time used when the signal input system arranges the plurality of sub-images formed by dividing the original image, guarantees timeliness of transmission of display signals and improves product quality.

In one exemplary implementation way, before step S103, the method further comprises the following step:

Step S102: determining a dividing manner of the original image according to pixel resolution of the received sub-images, so as to determine information of an arrangement manner of the sub-images.

Figure 3:
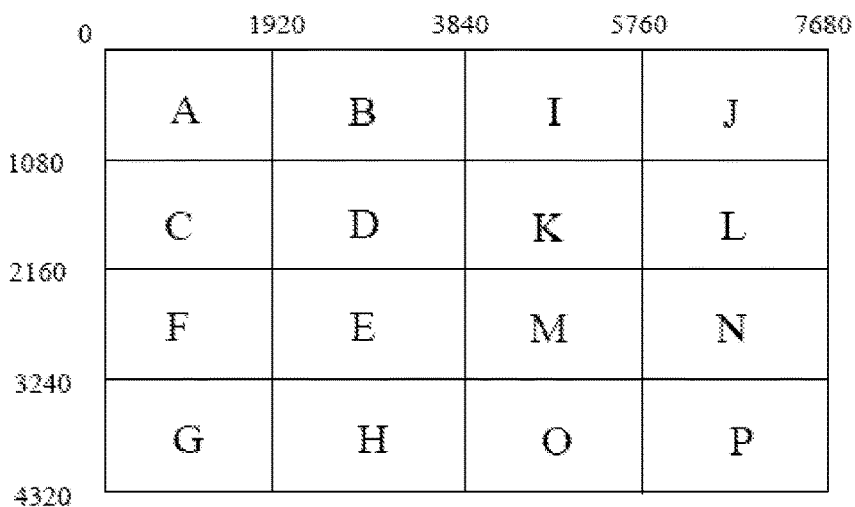
FIG. 3 is a dividing manner of an original image when the pixel resolution of sub-images in a display device provided by an embodiment of the present disclosure is 1920×1080.
Figure 4:
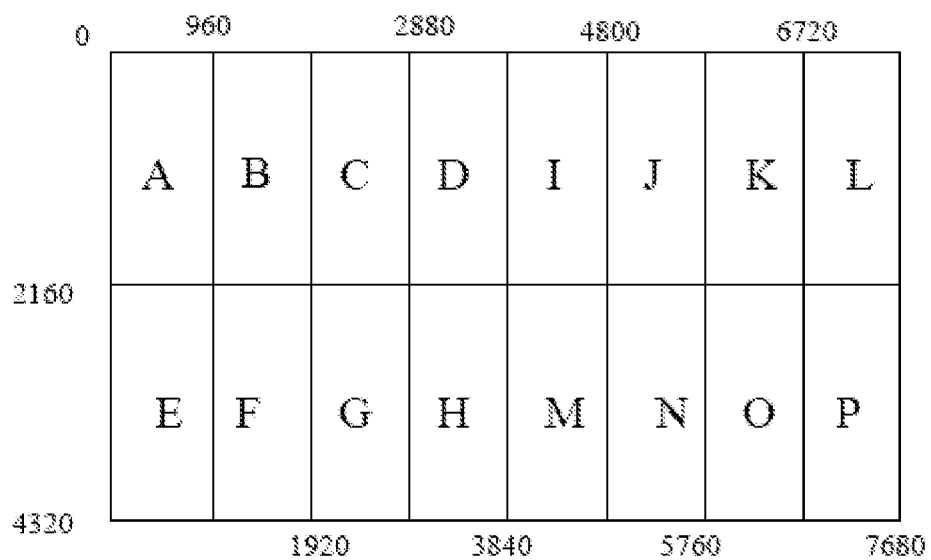
FIG. 4 is a dividing manner of the original image when the pixel resolution of the sub-images in the display device provided by the embodiment of the present disclosure is 960×2160.
Figure 5:
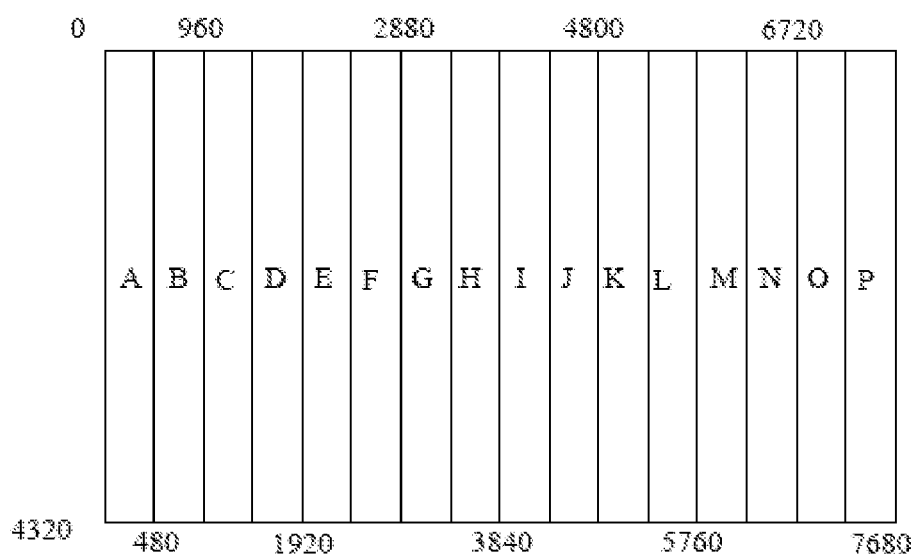
FIG. 5 is a dividing manner of the original image when the pixel resolution of the sub-images in the display device provided by the embodiment of the present disclosure is 480×4320.

For example, the pixel resolution of the received sub-images can be 1920×1080, 960×2160, or 480×4320, and the grouping manners are different for original images of different pixel resolutions; in the case the pixel resolution of the sub-images is 1920×1080, a dividing manner of the original image is as shown in FIG. 3; in the case the pixel resolution of the sub-images is 960×2160, a dividing manner of the original image is as shown in FIG. 4; and in the case the pixel resolution of the sub-images is 480×4320, a dividing manner of the original image is as shown in FIG. 5.

In one exemplary implementation way, above step S104 further includes: storing a judgment result of each circle and information of an arrangement manner of the sub-image units in the sub-image group of the current level till the step S105 is performed.

In the step S104, the sub-image units can be grouped again according to the above stored information, so that it can be conveniently achieved that the grouping manner of the sub-image units in the sub-image groups of the current level obtained by grouping the sub-image units again in the step S104 is different from manners which have been used for grouping before.

In one exemplary implementation way, after step S105, the method further comprises the following step:

Step 107: in the case edge matching between any two adjacent sub-images in an image formed by splicing sub-images is correct, storing corresponding information between an arrangement sequence of the sub-images in arranged image information and signal receiving units in the display device, which operation continues till a next operation.

Regarding the "next operation" described above, if pixel resolutions of different frames of image are different in one display process of the display device, the above "next operation" can be an operation of inputting a next frame of image; of course, if the pixel resolution of each frame of image is same in one display process of the display device, the "next operation" can be a next operation for connecting signal input lines and the sub-image receiving units of the display device.

Figure 2:
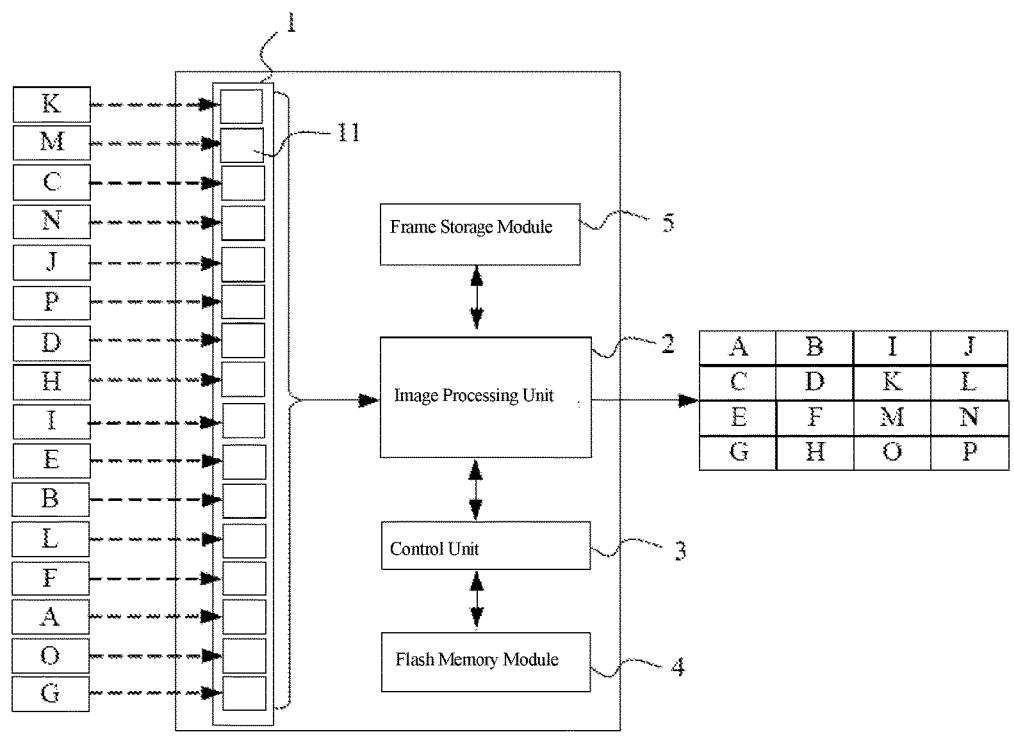
FIG. 2 is a principle schematic diagram of a signal input system provided by an embodiment of the present disclosure.

As shown in FIG. 2, an embodiment of the present disclosure further provides a display signal input device, the display signal input device comprising: sub-image receiving units 1, an image processing unit 2 in signal connection with the sub-image receiving units 1, and a control unit 3 in signal connection with the image processing unit 2; sub-image receiving units 1 are configured for receiving at least four sub-images formed by dividing an original image; the image processing unit 2 are configured for grouping the received sub-images into a plurality of sub-image groups of a base level, the sub-image group of the base level including at least two sub-image units, and each sub-image unit including at least one sub-image; and meanwhile, it is configured for judging information of edge matching between every two adjacent sub-image units in each sub-image group of a current level. Information of edge matching between two sub-image units in each sub-image group of the current level is judged, wherein: if edge matching between the sub-image units in at least one sub-image group of the current level is not correct, respective sub-image units are grouped again in a grouping manner different from that of the sub-image groups of the current level, and information of edge matching between the sub-image units in each sub-image group of the current level is judged again; if edge matching between the sub-image units in each sub-image group of the current level is correct, respective sub-image groups of the current level in the above judgment process are grouped as sub-image units so as to form sub-image groups of a new level, and then the sub-image groups of the new level are subjected to edge information judgment as the sub-image groups of the current level till edge matching between any two adjacent sub-images in an image formed by splicing the respective sub-images is correct;

The control unit 3 is configured for outputting information of the respective sub-images arranged in sequence to a display device when edge matching between any two adjacent sub-images in the image formed by splicing the respective sub-images is correct, so that the display device can display an image the same as the original image.

The display signal input system can relatively fast rank the sub-images formed by dividing the original image, which thus can improve operation performance of the display device.

Meanwhile, in the display device comprising the above display signal input system, respective display signal input data lines can be randomly connected with respective sub-image interfaces 11 in the sub-image receiving units 1, and installing difficulty between the display signal input data lines in the display device and the sub-image interfaces 11 of the sub-image receiving units 1 is reduced.

In one exemplary implementation mode, the display signal input system further comprises: a flash memory module 4 in signal connection with the control unit 3; the flash memory module 4 is used for storing corresponding information between an arrangement sequence of the respective sub-images in arranged image information and the signal receiving units 1 in the display device in the case edge matching between any two adjacent sub-images in the image formed by splicing the sub-images is correct, and this operation continues till a next operation.

Regarding the "next operation" described above, if pixel resolutions of different frames of image are different in one display process of the display device, the above "next operation" can be an operation of inputting a next frame of image; of course, if the pixel resolution of each frame of image is same in one display process of the display device, the "next operation" can be a next operation for connecting a signal input line and the sub-image receiving units of the display device.

For example, when the original image required to be input in the display device is a dynamic image, the above display signal input system may further comprise: a frame storage module, configured for caching the sub-images, that are output by the respective sub-image receiving units, into one frame and outputting the sub-images together to the display device.

One embodiment of the present disclosure further provides a display device, and the display device comprises any one display signal input device provided in the above implementation mode.

What are described above is related to the illustrative embodiments of the disclosure only and not limitative to the scope of the disclosure; the scopes of the disclosure are defined by the accompanying claims.

The application claims priority to the Chinese patent application No. 201510290761.X, filed on May 29, 2015, the entire disclosure of which is incorporated herein by reference as part of the present application.

What is claimed is:

1. A display signal input method, comprising:
   a first step: receiving at least four sub-images formed by dividing an original image;
   a second step: grouping the received sub-images into a plurality of sub-image groups of a base level, the sub-image group of the base level including at least two sub-image units, and each sub-image unit including at least one sub-image;
   a third step: judging information of edge matching between every two adjacent sub-image units in each sub-image group of a current level, wherein:
      if edge matching between the sub-image units in at least one sub-image group of the current level is not correct, respective sub-pixel units are grouped again in a grouping manner different from a grouping manner of the sub-image groups of the current level, and then the third step is repeated; or
      if edge matching between the respective sub-image units in each sub-image group of the current level is correct, a fourth step is performed;
   the fourth step: grouping respective sub-image groups of the current level judged in the third step as sub-image units so as to form sub-image groups of a new level, performing the third step with the formed the sub-image groups of the new level as the sub-image groups of the current level till edge matching between any two adjacent sub-images in an image formed by splicing the respective sub-images is correct, and performing a fifth step; and
   the fifth step: outputting information of the respective sub-images arranged in sequence to a display device, so that the display device can display an image same as the original image.

2. The display signal input method according to claim 1, before the second step, further comprising:
   determining a dividing manner of the original image according to pixel resolution of the received sub-images so as to determine information of an arrangement manner of the respective sub-images.

3. The display signal input method according to claim 1, wherein, the third step further comprises:
   storing a judgment result and information of an arrangement manner of the sub-image units in the sub-image group of the current level till the fourth step is performed.

4. The display signal input method according to claim 1, after the fourth step, further comprising:
   in a case edge matching between any two adjacent sub-images in the image formed by splicing the sub-images is correct, storing corresponding information between an arrangement sequence of the respective sub-images in arranged image information and signal receiving units in the display device, which operation continues till a next operation.

5. The display signal input method according to claim 1, wherein a number of the sub-images received in the first step is 16.

6. The display signal input method according to claim 5, wherein, in the second step, each sub-image group includes two sub-image units, each sub-image group of the base level includes two sub-image units, and one sub-image unit in each sub-image group of the base level includes one sub-image.

7. A display signal input system, comprising:
sub-image receiving units, configured for receiving at least four sub-images formed by dividing an original image;
an image processing unit in signal connection with the sub-image receiving units, configured for grouping the received sub-images into a plurality of sub-image groups of a base level, the sub-image group of the base level including at least two sub-image units, and each sub-image unit including at least one sub-image, and meanwhile, configured for judging information of edge matching between every two adjacent sub-image units in each sub-image group of a current level, wherein the information of edge matching between two sub-image units in each sub-image group of the current level is judged, wherein:
if edge matching between the sub-image units in at least one sub-image group of the current level is not correct, respective sub-image units are grouped again in a grouping manner different from a grouping manner of the sub-image group of the current level, and the information of edge matching between the sub-image units in each sub-image group of the current level is judged again; or
if edge matching between the sub-image units in each sub-image group of the current level is correct, respective sub-image groups of the current level in the above judgment process are grouped as sub-image units so as to form sub-image groups of a new level, and then the sub-image groups of the new level are subjected to edge information judgment as the sub-image groups of the current level till edge matching between any two adjacent sub-images in an image formed by splicing the respective sub-images is correct; and
a control unit in signal connection with the image processing unit, configured for outputting information of the respective sub-images arranged in sequence to a display device in a case edge matching between any two adjacent sub-images in the image formed by splicing the respective sub-images is correct, so that the display device can display an image same as the original image.

8. The display signal input system according to claim 7, further comprising:
a flash memory module in signal connection with the control unit, the flash memory module being configured for storing corresponding information between an arrangement sequence of the respective sub-images in arranged image information and signal receiving units in the display device in the case edge matching between any two adjacent sub-images in the image formed by splicing the respective sub-images is correct, which operation continues till a next operation.

9. The display signal input system according to claim 7, further comprising:
a frame storage module, configured for caching the sub-images, which are output from the respective sub-image receiving units, into a frame and outputting the sub-images to the display device together.

10. A display device, comprising the display signal input system according to claim 7.

11. The display device according to claim 10, wherein the display signal input system further comprises:
a flash memory module in signal connection with the control unit, the flash memory module being configured for storing corresponding information between an arrangement sequence of the respective sub-images in arranged image information and signal receiving units in the display device in the case edge matching between any two adjacent sub-images in the image formed by splicing the respective sub-images is correct, which operation continues till a next operation.

12. The display device according to claim 10, wherein the display signal input system further comprises:
a frame storage module, configured for caching the sub-images, which are output from the respective sub-image receiving units, into a frame and outputting the sub-images to the display device together.

13. The display signal input method according to claim 2, wherein a number of the sub-images received in the first step is 16.

14. The display signal input method according to claim 13, wherein, in the second step, each sub-image group includes two sub-image units, each sub-image group of the base level includes two sub-image units, and one sub-image unit in each sub-image group of the base level includes one sub-image.

15. The display signal input method according to claim 3, wherein a number of the sub-images received in the first step is 16.

16. The display signal input method according to claim 15, wherein, in the second step, each sub-image group includes two sub-image units, each sub-image group of the base level includes two sub-image units, and one sub-image unit in each sub-image group of the base level includes one sub-image.

17. The display signal input method according to claim 4, wherein a number of the sub-images received in the first step is 16.

18. The display signal input method according to claim 17, wherein, in the second step, each sub-image group includes two sub-image units, each sub-image group of the base level includes two sub-image units, and one sub-image unit in each sub-image group of the base level includes one sub-image.

* * * * *